United States Patent [19]

Nagano et al.

[11] Patent Number: 5,390,767
[45] Date of Patent: Feb. 21, 1995

[54] BRAKE CALIPER SUPPORT STRUCTURE FOR A BICYCLE

[75] Inventors: Masashi Nagano, Izumi; Tsuyoshi Sakashita; Masanori Sugimoto, both of Sakai, all of Japan

[73] Assignee: Shimano Inc., Osaka, Japan

[21] Appl. No.: 252,396

[22] Filed: Jun. 1, 1994

Related U.S. Application Data

[63] Continuation of Ser. No. 10,152, Jan. 28, 1993, abandoned.

[30] Foreign Application Priority Data

Feb. 7, 1992 [JP] Japan .............................. 4-004562[U]
Feb. 10, 1992 [JP] Japan .............................. 4-004852[U]
Feb. 21, 1992 [JP] Japan .............................. 4-007537[U]

[51] Int. Cl.⁶ ............................................... B62L 1/14
[52] U.S. Cl. ................................ 188/24.19; 188/24.21
[58] Field of Search ............... 188/24.11, 24.19, 24.12, 188/723, 216

[56] References Cited

U.S. PATENT DOCUMENTS 4,151,897 5/1979 Schoch ........................... 188/24.19
4,441,592 4/1984 Everett ........................ 188/24.12 X
4,754,853 7/1988 Nagano .
4,838,386 6/1989 Yoshigai ..................... 188/24.19 X

FOREIGN PATENT DOCUMENTS 432268 6/1991 European Pat. Off. .
2601318 1/1988 France .
3720115 12/1987 Germany .

Primary Examiner—Matthew C. Graham
Attorney, Agent, or Firm—Dickstein, Shapiro & Morin

[57] ABSTRACT

A brake caliper support structure has a stationary member fixed to a bicycle frame, a support shaft fixed to the stationary member, a brake caliper pivotably supported by the support shaft, a spring having one end thereof engaged with the brake caliper, and an elasticity adjusting device disposed between the brake caliper and spring for adjusting elasticity of the spring. The elasticity adjusting device includes an engaging member and an adjusting screw. The engaging member is rotatable about the support shaft. This support structure further includes a shoulder and a groove formed on the support shaft for restricting displacement of the engaging member on the support shaft.

20 Claims, 6 Drawing Sheets a bicycle, and more particularly to a structure for fixing a spring bearing forming part of a device for adjusting a biasing force of a spring acting against a brake control cable.

BRAKE CALIPER SUPPORT STRUCTURE FOR A BICYCLE

This application is a continuation of application Ser. No. 8/010,152, filed Jan. 28, 1993, now abandoned.

BACKGROUND OF THE INVENTION

1. FIELD OF THE INVENTION

The present invention relates to a brake caliper support structure for a bicycle, and more particularly to a structure for fixing a spring bearing forming part of a device for adjusting a biasing force of a spring acting against a brake control cable.

2. Description of the Related Art

A bicycle brake such as a cantilever type brake includes a biasing spring mounted on a support shaft fixed to a bicycle frame for supporting each of brake calipers. This biasing spring acts against a brake control cable. In some cases, the spring has an adjusting screw attached thereto for adjusting the biasing force of the spring to adjust a spacing between a wheel rim and a brake shoe secured to the caliper. To adjust the biasing force, a spring bearing is mounted between the spring and adjusting screw. Conventionally, this spring bearing is secured to the caliper only through the spring. When the adjusting screw is turned, the spring bearing may be tilted or displaced sideways by a torsional force of the adjusting screw, often hampering a smooth and efficient adjusting operation.

SUMMARY OF THE INVENTION

An object of the present invention is to provide a structure for a caliper of a bicycle brake for restricting tilting relative to a support shaft and axial displacement of an engaging member engaging an elastic element, or of a spring bearing where the elastic element is a spring, forming part of an elasticity adjusting device, while allowing the caliper to pivot about the support shaft, to enable a smooth and efficient biasing force adjusting operation.

The above object is fulfilled, according to the present invention, by a caliper brake support structure comprising a stationary member fixed to a bicycle frame, a support shaft fixed to the stationary member, a brake caliper pivotably supported by the support shaft, an elastic member having one end thereof engaged with the brake caliper, an elasticity adjusting device disposed between the brake caliper and the elastic member for adjusting elasticity of the elastic member, the elasticity adjusting device including an engaging member rotatable about the support shaft and engaged with the one end of the elastic member, and a restricting device formed on the support shaft for restricting displacement of the engaging member on the support shaft.

With the brake caliper support structure according to the present invention, the restricting device prevents the engaging member disposed between the elastic member and an elasticity adjusting screw from tilting and being axially displaced relative to the support shaft supporting the brake caliper. Consequently, an operation to adjust a biasing force of the elastic member may be carried out smoothly and efficiently.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Figure 1:
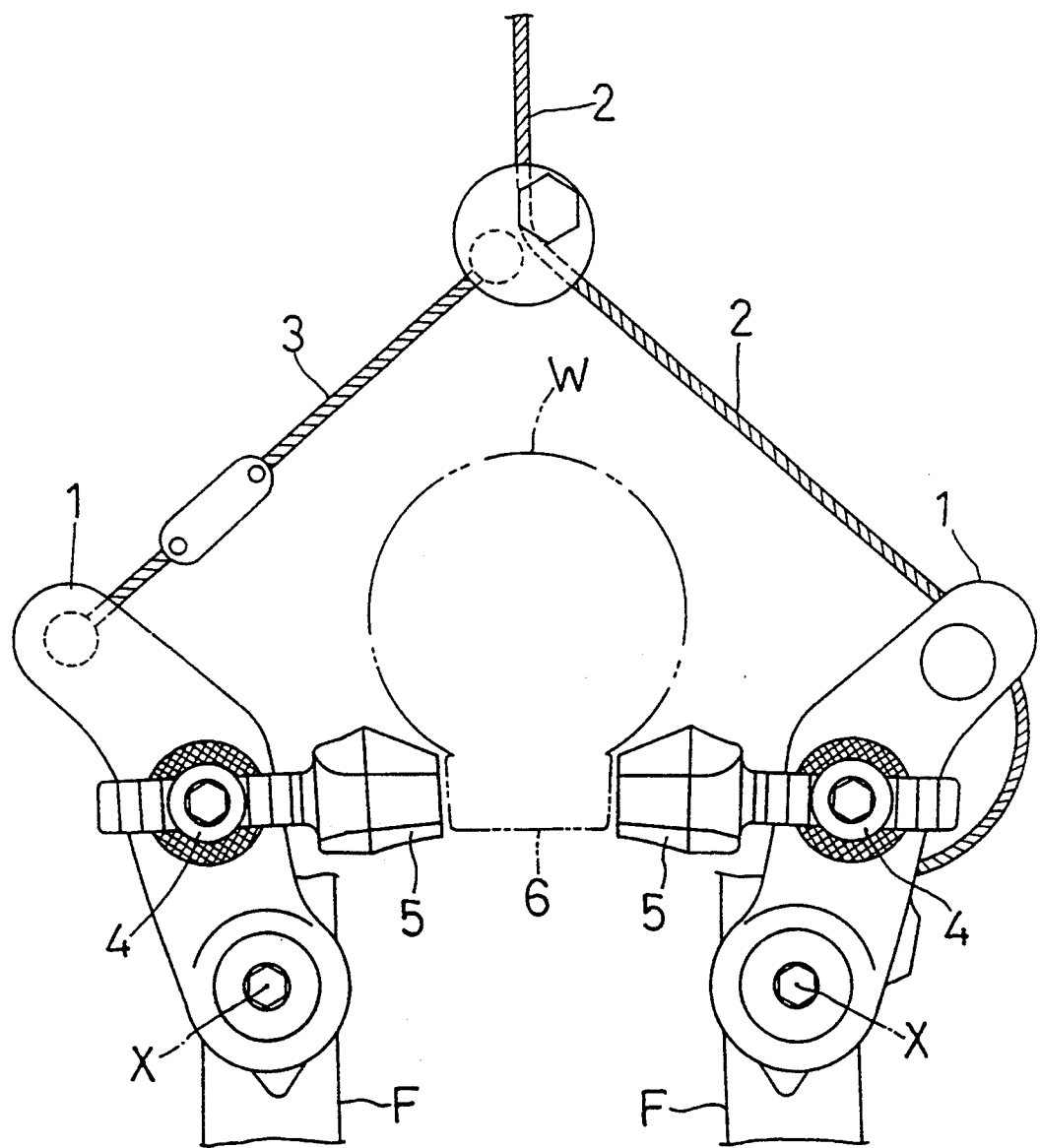
FIG. 1 is a view showing a principal portion of a caliper brake of a bicycle.

FIG. 1 shows a cantilever type caliper brake of a bicycle. This brake includes a pair of brake calipers 1 attached to bicycle frames F opposed to each other across a wheel W. Each of the brake calipers 1 is pivotable relative to the frame F about an axis X. One of the calipers 1 is connected at a free end thereof to a brake cable 2, while the other caliper 1 is connected at a free end thereof to the brake cable 2 through a connector 3. Thus, the caliper brake is operable by pulling and relaxing the brake cable 2.

Figure 2:
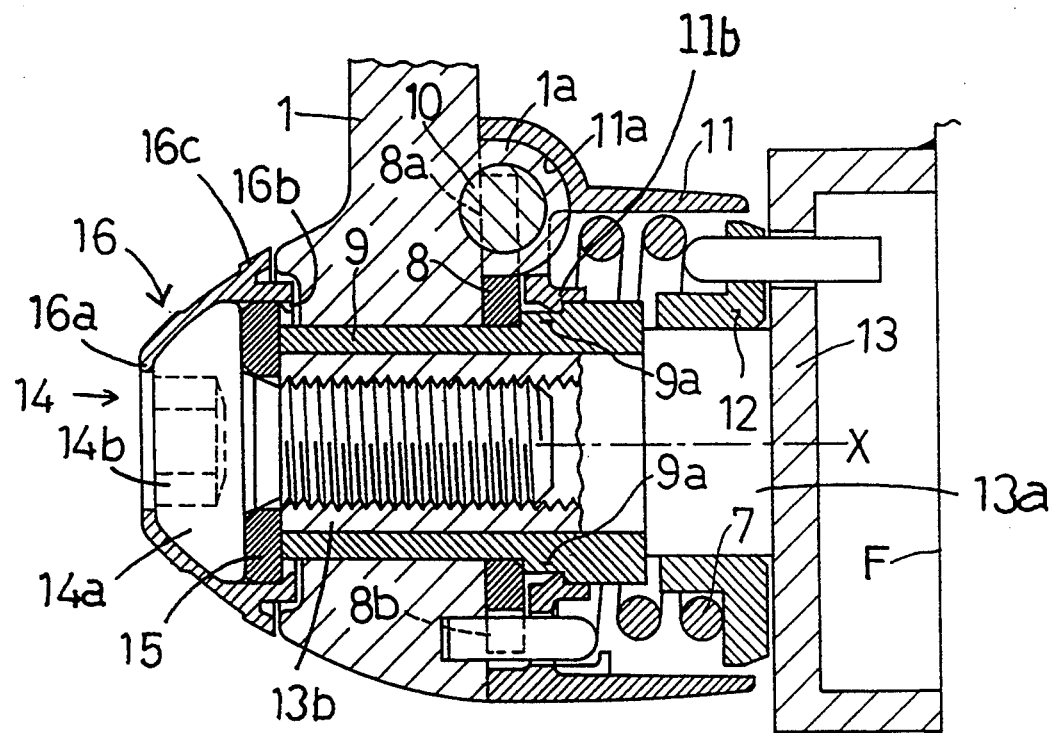
FIG. 2 is a sectional view taken on a plane including a pivotal axis X of a brake caliper shown in FIG. 1, showing a portion relating to a restricting device according to the present invention.

When the brake cable 2 is pulled, the right and left brake calipers 1 pivot upward under the operating force. This causes brake shoes 5 attached to intermediate positions of the brake calipers i through shoe clamps 4 to press upon side surfaces of a wheel rim 6 to apply friction brakes thereto. When the brake cable 2 is relaxed, the brake calipers 1 pivot downward under the biasing force of return springs 7 acting on proximal ends thereof as shown in FIG. 2. As a result, the brakes shoes 5 retract from the side surfaces of the wheel rim 6 to cancel the brakes.

As shown in FIG. 2, a structure for connecting each brake caliper 1 to the bicycle frame F includes a mounting screw 14 and a plastic cap 16.

Specifically, a brass bush 9 is press fit in a mounting bore, not to be readily detachable therefrom, formed in the proximal end of each brake caliper 1. A brake bracket 13 fixed to the bicycle frame F has a caliper support shaft 13b extending therefrom to support the proximal end of the brake caliper 1 pivotably mounted thereon through the bush 9. The support shaft 13b and bush 9 act as a supporting device in this embodiment. The mounting screw 14 is meshed into a forward portion of the support shaft 13b, with a washer 15 disposed between a head 14a of the screw 14 and the bush 9. The mounting screw 14 acts through the washer 15 and bush 9 to hold the brake caliper 1 in place. The washer 15 has a buffer function to avoid deformation of the bush 9 under a clamping force of the mounting screw 14.

Figure 3A:
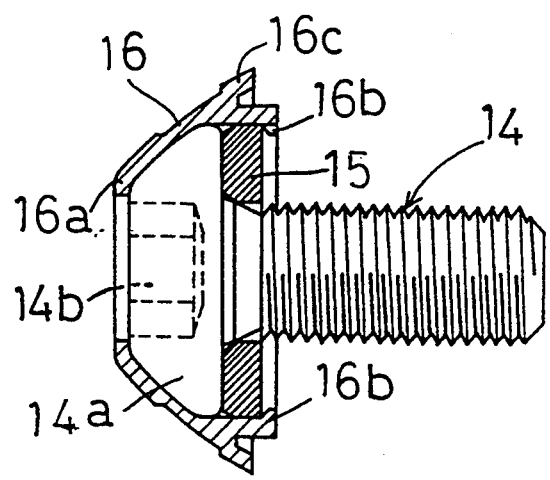
FIG. 3A is a sectional view taken on the same plane as FIG. 2, showing a mounting screw.

As shown in FIG. 3A, the cap 16 is mounted on the head 14a to be supported by the mounting screw 14. To present a good outward appearance, the cap 16 covers the head 14a except a socket 14b to receive a tool for tightening the mounting screw 14, a position between the head 14a and the proximal end of the brake caliper 1, and the washer 15.

The cap 16 has a first engaging portion 16a formed at one end thereof for engaging the head 14a of the mounting screw 14, and a second engaging portion 16b formed at the other end thereof for engaging the washer 15. Thus, the washer 15 and cap 16 may also be assembled in a single operation to attach the mounting screw 14 to the support shaft 13b.

Specifically, the first engaging portion 16a is shaped, and elastically deformable since it is formed of plastic, to fit around the head 14a of the mounting screw 14. The second engaging portion 16b is shaped to extend toward a threaded portion of the mounting screw 14, and elastically deformable since it is formed of plastic, to fit around the washer 15.

Thus, the cap 16 is fitted on the mounting screw 14 and washer 15 through the engaging portions 16a and 16b, thereby connecting the mounting screw 14 and washer 15 together. In other words, the mounting screw 14, washer 15 and cap 16 are formed into a unit as shown in FIG. 3A. An operation to attach the mounting screw 14 to the support shaft 13b completes assembly of the mounting screw 14, washer 15 and cap 16 at a stroke.

The cap 16 further includes a sealing tongue 16c defining therein a sealing labyrinth structure and a grease holding chamber G.

The cap 16 may simply cover the position between the mounting screw 14 and brake caliper 1, and the washer 15. In this embodiment, however, the cap 16 acts also as a seal element for preventing entry of rainwater, mud and like between the mounting screw 14 and brake caliper 1.

Figure 3B:
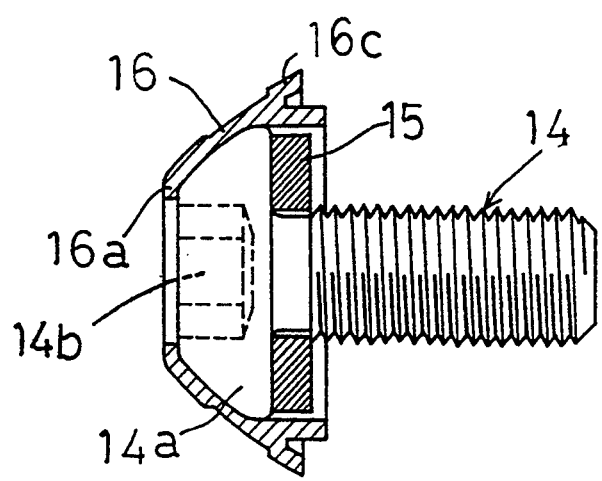
FIG. 3B is a sectional view of a mounting screw having a different construction to the mounting screw shown in FIG. 3A.

In the above construction, the mounting screw 14, washer 15 and cap 16 are formed into a unit by utilizing the cap 16. This provides an advantage of requiring a reduced number of components to form the unit. However, a construction as shown in FIG. 3B may be employed.

In this construction, the washer 15 is mounted on a shank of the mounting screw 14 before the threads are formed, and thereafter the threads are forged on the shank. The threads thus formed have a larger outside diameter than the shank, and act as a stopper to hold the washer 15 on the mounting screw 14. The cap 16 may be secured to the head 14a of the mounting screw 14 or to the washer 15, whereby the mounting screw 14, washer 15 and cap 16 are formed into a unit.

This invention may be applied to a mounting structure for varied bicycle components other than the brake caliper 1, such as a derailleur and a shift lever.

A caliper support structure according to the present invention will be described next.

As shown in FIG. 2, a spring bearing 8 for engaging the return spring is mounted for rotation about the axis X on the bush 9 press fit in the mounting bore of the brake caliper 1 to be immovable relative to the brake caliper 1. An adjusting screw 10 is meshed in a screw receiving portion 1a formed simultaneously with the brake caliper 1. A tubular caliper-side spring cover 11 is attached to the bush 9 for coveting the return spring 7. This spring cover 11 defines an adjusting bore 11a. This construction enables adjustment of a restoring force for returning the brake caliper I to an inoperative position.

The spring beating 8 has a disk-like overall shape, with an inside diameter substantially corresponding to an outside diameter of the bush 9, and is disposed substantially perpendicular to the support shaft 13b. The screw receiving portion 1a, adjusting screw 10 and spring beating 8 are collectively called an elasticity adjusting device herein.

Figure 4:
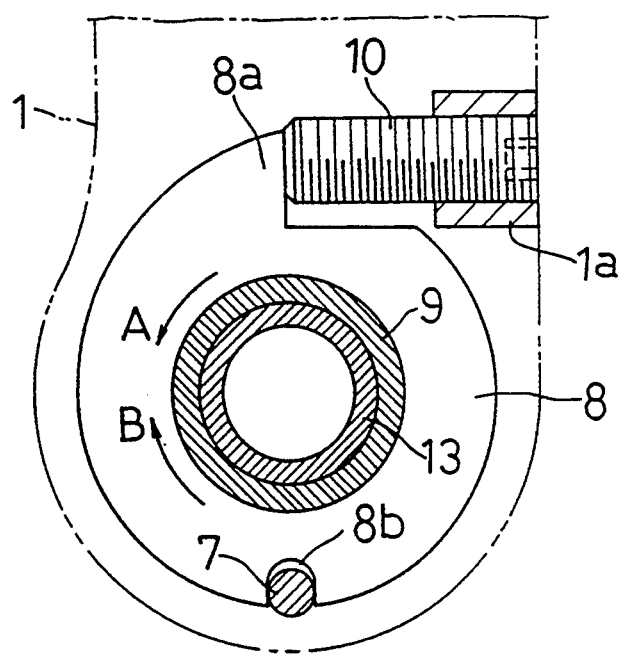
FIG. 4 is a front view of an elasticity adjusting device shown in FIG. 2.

A tool (not shown) is inserted through the adjusting bore 11a into the spring cover 11 to turn the adjusting screw 10. As a result, the biasing force of the return spring 7 is variable. Details of this construction are as follows. The return spring 7 has an end extending through a frame-side spring cover 12 into a spring receiving bore formed in the brake bracket 13, to be supported by the bicycle frame F through the brake bracket 13. As shown in FIG. 4, the other end of the return spring 7 extends into a cutout 8b of the spring bearing 8 to be rotatable with the spring beating 8. The adjusting screw 10 is supported by the brake caliper I through the meshing engagement with the screw receiving portion 1a, and contacts an arm portion 8a of the spring bearing 8 to act as a stopper for the spring bearing 8. Thus, the other end of the return spring 7 is supported by the brake caliper i through the spring beating 8 and adjusting screw 10.

When the adjusting screw 10 is turned, the adjusting screw 10 moves relative to the screw receiving portion 1a inwardly or outwardly of the caliper-side spring cover 11. In its movement inwardly of the cover 11, the adjusting screw 10 pushes the arm portion 8a to rotate the spring bearing 8 relative to the brake caliper 1 in a direction A in FIG. 4. As a result, the spring beating 8 adjusts the return spring 7 by distorting it in a winding direction or an unwinding direction thereof. When the adjusting screw 10 is retracted from the arm portion 8a outwardly of the cover 11, the spring bearing 8 rotates in a direction B in FIG. 4 under the elastic restoring force of the return spring 7. Consequently, the spring bearing 8 adjusts the return spring 7 in the winding direction or unwinding direction thereof.

As shown in FIG. 2, the bush 9 defines a shoulder or stopper 9a to act as a restricting device for the spring bearing 8. During adjustment of the biasing force of the return spring 7, the restricting device restricts tilting and displacement along the support shaft 13b of the spring bearing 8 even if a force acts to tilt the spring beating 8 relative to the pivotal axis X owing to play between the spring bearing 8 and bush 9 and the distorting force applied by the adjusting screw 10.

That is, when the spring beating 8 tilts relative to the pivotal axis X, the stopper 9a contacts an inner portion of the spring bearing 8 to restrict the tilting of the spring bearing 8 to a predetermined tilt angle relative to the axis X. This tilt angle is selected so that the adjusting screw 10 contacts the arm portion 8a of the spring bearing 8 over an area and in a positional relationship to push or bear the spring bearing 8 effectively.

Figure 5:
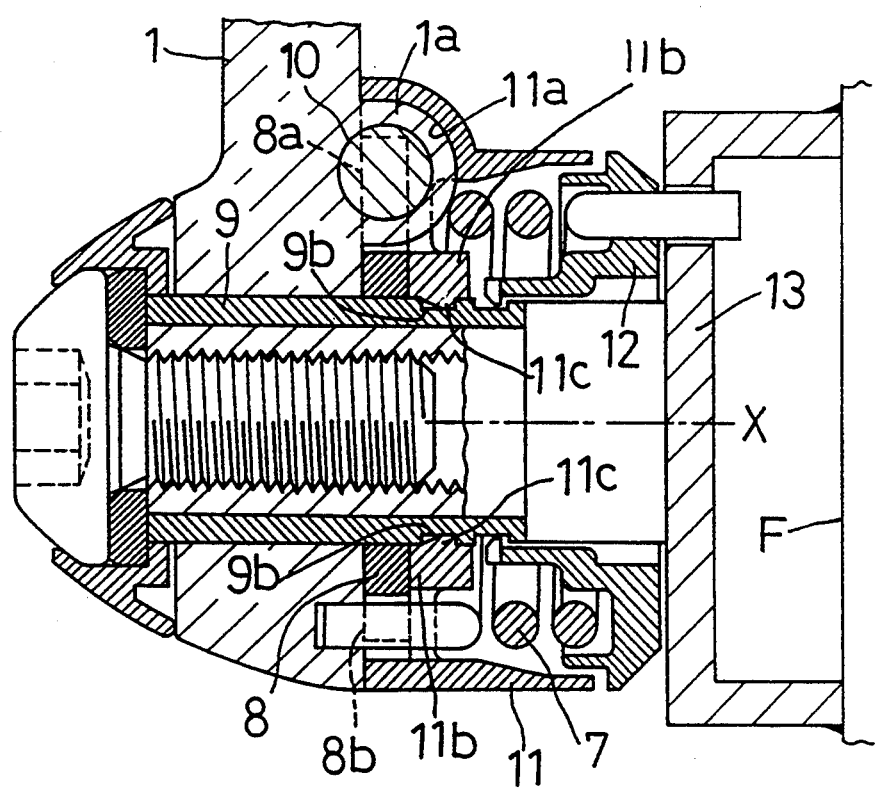
FIG. 5 is a view showing a restricting device in another embodiment of the invention.

FIG. 5 shows a modified restricting device which is in the form of a stopper defined by a portion 11b of the caliper-side spring cover 11 to act on the spring bearing 8. Although the caliper-side spring cover 11 is a component separate from the bush 9, the portion 11b of the cover 11 includes an attaching projection 11c engaged with a cover support groove 9b of the bush 9 to act as the restricting device. In this way, the spring beating 8 is connected to the bush 9 to be immovable relative thereto against a reaction of support. Thus, the portion 11b of the spring cover contacts and bears the spring bearing 8.

Other embodiments will be described hereinafter.

Figure 6:
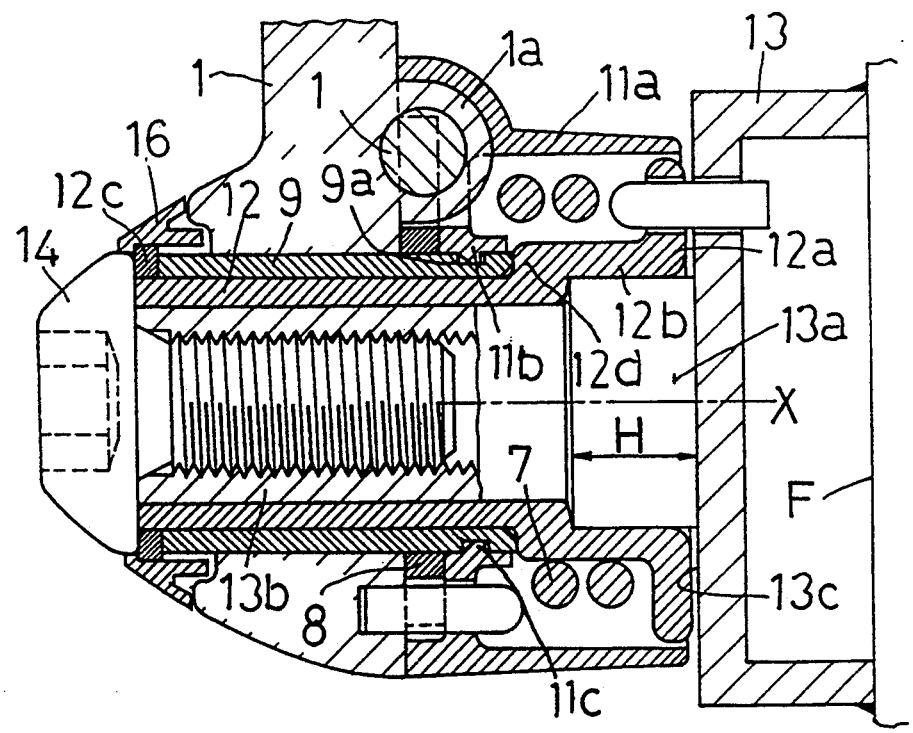
FIG. 6 is a view showing a restricting device in a further embodiment of the invention.

As shown in FIG. 6, the brake caliper 1 is mounted on an end region of a tubular shaft 12 which is an extension of the frame-side spring cover, through a metallic bush 9 press fit in the mounting bore formed in the proximal end of the brake caliper 1. The tubular shaft 12 is mounted on a caliper support shaft 13a extending from the brake bracket 13 secured to the bicycle frame F. The mounting screw 14 is meshed in the support shaft 13a to retain the tubular shaft 12 on the support shaft 13a, thereby to assemble the brake caliper 1 to the bicycle frame F. With the brake caliper 1 mounted in place, one end of the return spring 7, which is a torsion coil spring, extends through a seat portion 12a of the tubular shaft 12 into a spring receiving bore of the brake bracket 13. Thus, the return spring 7 acts as a stopper for holding the tubular shaft 12 against rotation relative to the support shaft 13a. The bush 9 is press fit in the brake caliper 1 to be unrotatable relative thereto. Consequently, the brake caliper 1 is pivotable through the bush 9 relative to the tubular shaft 12.

The return spring 7 is mounted on a shaft portion 12b of the tubular shaft 12 extending from the bush 9 toward a proximal end of the support shaft 13a. This shaft portion 12b provides guiding action to set the return spring 7 to position. One end of the return spring 7 extends into the spring receiving bore of the brake bracket 13 to be engaged therewith. The other end of the return spring 7 penetrates a connecting portion 11b of the spring cover 11 to be engaged with the brake caliper 1 through the spring bearing 8, adjusting screw 10 and screw receiving portion 1a. The return spring 7 applies a biasing force to the brake caliper 1 through the spring beating 8 and adjusting screw 10, with the brake bracket 13 acting as a reaction element, thereby biasing the brake caliper 1 in a brake releasing direction.

The spring cover 11 is a plastic cover surrounding the return spring 7 to protect the return spring 7 from dust and the like. The spring cover 11 is elastically deformed to fit on the bush 9, to place a projection 11c of the connecting portion 11b in a cover supporting groove 9a of the bush 9. Thus, the spring cover 11 is supported by the tubular shaft 12 through the bush 9.

Figure 7:
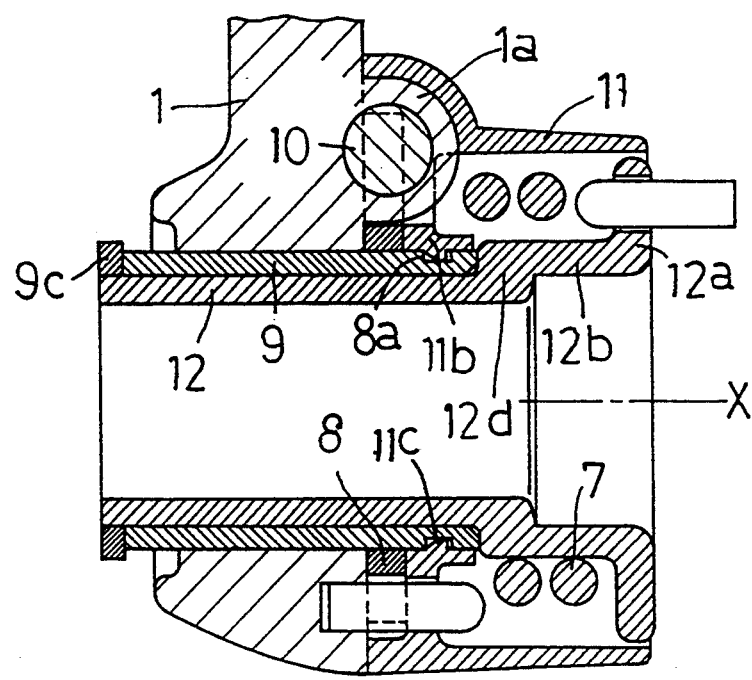
FIG. 7 is a sectional view of a principal portion formed as a unit in the embodiment shown in FIG. 6.

The tubular shaft 12 includes a first stopper 12c formed in a forward end thereof to act on the bush 9. A ring defining a support for a sealing cap 16 is press fit in the tubular shaft 12. The shaft portion 12b of the tubular shaft 12 provides a shoulder on an outer periphery thereof to define a second stopper 12d acting on the bush 9. The brake caliper 1, bush 9, return spring 7, cover 11 and tubular shaft 12 are formed into a unit as shown in FIG. 7. An operation to connect the tubular shaft 12 to the caliper support shaft 13a completes assembly of this unit to the bicycle frame F at a stroke.

That is, the brake caliper 1 and bush 9 are not readily separable since the bush 9 is press fit in the caliper 1. The cover 11 and bush 9 are not readily separable because of the connection through the projection 11c of the connecting portion 11b and the cover supporting groove 9a of the bush 9. The first stopper 12c and second stopper 12d contact opposite ends of the bush 9 to maintain the bush 9 on the tubular shaft 12. The seat portion 12a of the tubular shaft 12 contacts one end of the return spring 7, so that the return spring 7 is not detachable from the tubular shaft 12. The first stopper 12c, second stopper 12d and seat portion 12a retain the brake caliper 1, bush 9, return spring 7 and cover 12 in the state assembled to the tubular shaft 12. Consequently, the brake caliper 1, bush 9, return spring 7, cover 11 and tubular shaft 12 constitute the unit to be assembled to the bicycle frame F in a single operation.

In the above construction, the caliper support shaft 13a of large diameter has an increased height H so that the seat portion 12a of the tubular shaft 12 is out of contact with an opposed surface 13c of the brake bracket 13. This provides a relatively strong support for the return spring 7 to allow elastic deformation of the spring 7 with pivotal movement in a brake applying direction of the brake caliper 1, even if the end of the return spring 7 is insufficiently inserted into the spring receiving bore of the brake bracket 13.

Figure 8:
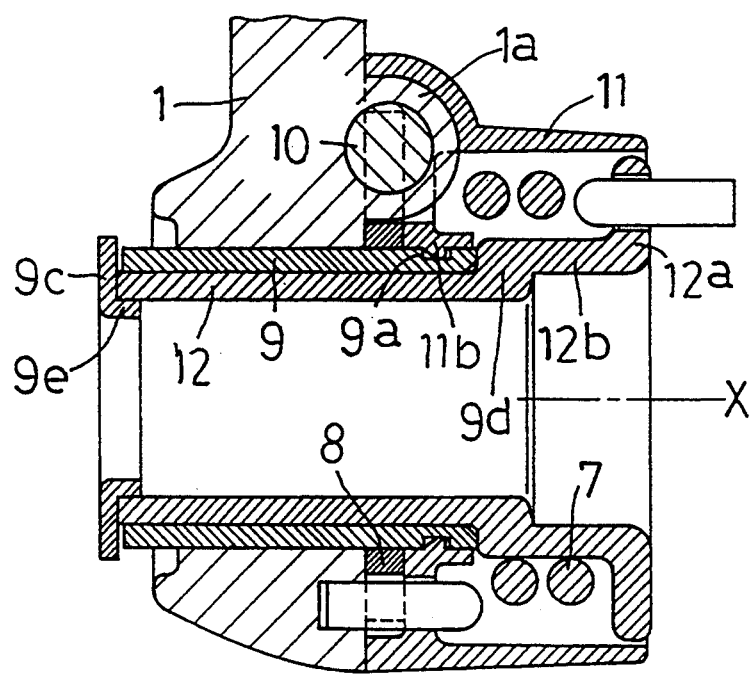
FIG. 8 is a sectional view showing a restricting device in a still further embodiment of the invention.

That is, even with the seat portion 12a of the tubular shaft 12 out of contact with the opposed surface 13c of the brake bracket 13, a tightening force applied to the mounting screw 14 positively presses the tubular shaft 12 upon the support shaft 13a to provide a relatively strong support against rotation of the tubular shaft 12. In addition, one end of the return spring 7 extends through and engaged with the seat portion 12a of the tubular shaft 12. Thus, the tubular shaft 12 provides a relatively strong support for the return spring 7, so that the spring 7 does not rotate with pivotal movement of the brake caliper 1 even if the end of the return spring 7 is insufficiently inserted into the brake bracket 13. As shown in FIG. 8, the first stopper 12c of the tubular shaft 12 acting on the bush 9 may be defined by an element 9e press fit in the forward end of the tubular shaft 12. Thus, the first stopper 12c is not readily detachable from the tubular shaft 12.

The stoppers 12c and 12d and seat portion 12a may be replaced with stopper rings mounted on the tubular shaft 12 to contact or receive the bush 9 and return spring 7. In this way, or in various other ways, the bush 9, brake caliper 1 and return spring 7 may be retained on the tubular shaft 12. The bush 9 may be replaced with a needle bearing or the like.

A stopper for the spring bearing 8 may be defined by an additional element provided specially for the purpose, instead of the bush or spring cover. Further, a stopper may be connected directly to the brake caliper 1. That is, the stopper may be formed on the brake caliper 1, or may be formed on an element connected to the brake caliper 1.

What is claimed is:

1. A caliper brake for a bicycle comprising:
   a stationary member fixed to a bicycle frame;
   support means fixed to said stationary member;
   a brake caliper pivotably supported by said support means;
   an elastic member having one end thereof engaged with said brake caliper;
   elasticity adjusting means disposed between said brake caliper and said elastic member for adjusting elasticity of said elastic member, said elasticity adjusting means including an engaging member freely rotatably mounted on said support means, said engaging member being engaged with said one end of said elastic member; and
   restricting means for restricting displacement of said engaging member on said support means, said restricting means including a groove formed peripherally of said support means and a stopper, said stopper being engaged with said groove and thereby being restricted against displacement on said support means, said stopper being separate from said support means, said restricting means being arranged such that displacement of said engaging member on said support means is restricted to a predetermined amount by contact of said engaging member against said stopper.

2. A caliper brake for a bicycle comprising:
a stationary member fixed to a bicycle frame;
support means fixed to said stationary member, said support means including a tubular bush;
a brake caliper pivotably supported by said bush;
an elastic member having one end thereof engaged with said brake caliper;
elasticity adjusting means disposed between said brake caliper and said elastic member for adjusting elasticity of said elastic member, said elasticity adjusting means including an engaging member freely rotatably mounted on said support means, said engaging member being engaged with said one end of said elastic member;
a cover member for substantially covering said elastic member;
unitary means for allowing said bush and said cover member to be installed as a unit; and
restricting means formed on said bush, said restricting means including a shoulder for contacting said engaging means and for thereby restricting displacement of said engaging member on said support means to a predetermined amount.

3. A caliper brake as defined in claim 2, wherein said unitary means includes an inner portion (11b) engageable with said bush, said unitary means being integral with said cover member (11).

4. A caliper brake as defined in claim 3, wherein said bush has an annular groove (9a) formed therein, said inner portion of said unitary means being located within said annular groove.

5. A caliper brake for a bicycle comprising:
a stationary member fixed to a bicycle frame;
support means fixed to said stationary member;
a brake caliper pivotably supported by said support means;
an elastic member having one end thereof engaged with said brake caliper;
elasticity adjusting means disposed between said brake caliper and said elastic member for adjusting elasticity of said elastic member, said elasticity adjusting means including an engaging member freely rotatably mounted on said support means, said engaging member being engaged with said one end of said elastic member; and
restricting means formed on said support means, said restricting means including a shoulder for contacting said engaging means and for thereby restricting displacement of said engaging member on said support means to a predetermined amount.

6. A caliper brake as defined in claim 5, wherein said engaging member is in the form of a disk disposed substantially perpendicular to said support means.

7. A caliper brake as defined in claim 5, wherein said support means includes a support shaft formed integral with said stationary member, and a tubular bush mounted on said support shaft.

8. A caliper brake as defined in claim 7, wherein said engaging member is in the form of a disk disposed substantially perpendicular to said support means and said disk defines a bore having an inside diameter substantially corresponding to an outside diameter of said bush.

9. A caliper brake as defined in claim 7, wherein said bush is in frictional engagement with said brake caliper.

10. A caliper brake as defined in claim 5, wherein said elastic member has the other end engaged with said stationary member.

11. A caliper brake as defined in claim 10, wherein said elastic member comprises a coil spring.

12. A caliper brake as defined in claim 5, wherein said displacement of said engaging member is tilting relative to said support means, said restricting means being operable to restrict the tilting of said engaging member within a predetermined angle.

13. A caliper brake as defined in claim 5, wherein said displacement of said engaging member is parallel movement relative to said support means.

14. A caliper brake as defined in claim 5, wherein said elasticity adjusting means further includes an adjusting screw for contacting said engaging member.

15. A caliper brake as defined in claim 14, wherein said adjusting screw is meshed with said brake caliper.

16. A caliper brake as defined in claim 5, wherein said support means defines a threaded bore for meshing with mounting screw means for connecting said brake caliper to said stationary member.

17. A caliper brake as defined in claim 16, wherein said mounting screw means includes a mounting screw, a washer, and a cap for covering part of a head of said mounting screw and said washer.

18. A caliper brake as defined in claim 17, wherein said mounting screw includes a socket formed in said head for receiving a tightening tool, said cap covering said head except said socket, and including a portion extending toward a threaded portion of said mounting screw to prevent detachment of said washer from said cap.

19. A caliper brake for a bicycle comprising:
support means fixed to a stationary member that is fixed to a bicycle frame;
a brake caliper pivotably supported by said support means;
an elastic member having one end thereof engaged with said brake caliper;
elasticity adjusting means disposed between said brake caliper and said elastic member for adjusting elasticity of said elastic member, said elasticity adjusting means including an engaging member freely rotatably mounted on said support means, said engaging member being engaged with said one end of said elastic member; and
restricting means for restricting displacement of said engaging member on said support means, said restricting means including a groove formed peripherally of said support means and a stopper, said stopper being engaged with said groove and thereby being restricted against displacement on said support means, said stopper being separate from said support means, said restricting means being arranged such that displacement of said engaging member on said support means is restricted to a predetermined amount by contact of said engaging member against said stopper.

20. A caliper brake for a bicycle comprising:
support means fixed to a stationary member that is fixed to a bicycle frame;
a brake caliper pivotably supported by said bush;
an elastic member having one end thereof engaged with said brake caliper;

elasticity adjusting means disposed between said brake caliper and said elastic member for adjusting elasticity of said elastic member, said elasticity adjusting means including an engaging member freely rotatably mounted on said support means, said engaging member being engaged with said one end of said elastic member;

a cover member for substantially covering said elastic member;

unitary means for allowing said bush and said cover member to be installed as a unit; and restricting means formed on said bush, said restricting means including a shoulder for contacting said engaging means and for thereby restricting displacement of said engaging member on said support means to a predetermined amount.

* * * * *